United States Patent [19]

Sykes

[11] 4,021,129
[45] May 3, 1977

[54] MECHANICAL CONNECTIONS BETWEEN ADJACENT MEMBERS

[75] Inventor: Christopher C. Sykes, London, England

[73] Assignee: Nexus Manufacturing Limited, Great Britain

[22] Filed: Jan. 12, 1976

[21] Appl. No.: 648,564

[52] U.S. Cl. .............................. 403/252; 403/255; 52/248
[51] Int. Cl.² ......................................... F16B 12/44
[58] Field of Search .......... 403/187, 257, 231, 252, 403/254, 255; 52/758 H, 656, 710

[56] References Cited

UNITED STATES PATENTS

| | | | |
|---|---|---|---|
| 3,261,625 | 7/1966 | Cripe | 52/758 H |
| 3,451,183 | 6/1969 | Lespagnol et al. | 52/656 |
| 3,537,736 | 11/1970 | Gunner-Kroop | 403/171 |
| 3,592,493 | 7/1971 | Goose | 52/656 X |
| 3,858,989 | 1/1975 | Field | 403/362 X |

FOREIGN PATENTS OR APPLICATIONS

| | | | |
|---|---|---|---|
| 274,115 | 10/1965 | Australia | 403/231 |
| 1,191,539 | 4/1965 | Germany | 52/656 |

Primary Examiner—Andrew V. Kundrat
Attorney, Agent, or Firm—George J. Neilan

[57] ABSTRACT

A joint between a member having an inwardly lipped, channel-shaped cross section and a hollow rail comprises a connection including a key portion which has a head with inclined engagement surfaces located between the sides of the channel-shaped member which also includes engagement surfaces having a corresponding inclination, a clamping device engaging means on the connector to urge the engagement surfaces of the head of the key portion into locking engagement with the surfaces on the lips so that the lips are prevented from splaying apart when the joint is stressed, the connector also including a tongue portion extending away from the key portion and having a threaded hole at the base of a ramp surface, the tongue being inserted into the hollow rail. A hole in the rail is offset from the threaded hole in a direction away from the key portion and the joint also comprises a bolt having a counter-sunk head which is inserted through the hole into the threaded hole, so that, as the bolt is tightened the combination of the counter-sunk head, the offset holes and the ramp surface urge the rail towards the key portion to tighten the joint.

7 Claims, 3 Drawing Figures

MECHANICAL CONNECTIONS BETWEEN ADJACENT MEMBERS

This invention is concerned with a connector for use in a joint between two members, usually two mutually perpendicular metal members, and for a completed joint incorporating the connector.

An example of such a joint is a joint between a leg and a rail of a table and this joint has to be particularly strong if the design of the table does not include stretchers since the forces on the joint are substantial as the leg acts like a lever. Consequently these joints are frequently the weakest points in the construction of a table and it is an aim of this invention to provide a connector for use in overcoming this weakness.

According to this invention, a connector for joining a member having an inwardly lipped, channel-shaped cross-section to a hollow rail comprises a key portion having means to engage a clamping device, and a tongue portion extending away from the key portion and having a ramp surface and a screw-threaded hole at the base of the surface, a head of the key portion being, in use, arranged to slide between the sides of the channel-shaped member so that a clamping device engaging the means urges the head of the key portion against the lips of the channel to fix the connector to the member, the rail sliding over the tongue portion towards the key portion and a bolt having a counter-sunk head being inserted through a hole in the rail and being screwed into the threaded hole, the head of the bolt cooperating with the ramp suface to urge the rail towards the key portion as the bolt is screwed into the threaded hole to ensure a rigid joint.

According to another aspect of this invention a joint between a member having an inwardly lipped, channel-chaped cross-section and a hollow rail comprises a connector including a key portion which has a head located between the sides of the channel-shaped member, a clamping device engaging means on the connector to urge the head of the key portion into locking engagement with the lips, the connector also including a tongue portion extending away from the key portion and having a screw-threaded hole at the base of a ramp surface, the tongue being inserted into the hollow rail, a hole in the rail being offset from the screw-threaded hole in a direction away from the key portion, the joint also comprising a bolt having a counter-sunk head which is inserted through the hole into the threaded hole, so that, as the bolt is tightened the combination of the counter-sunk head, the offset holes and the ramp surface urge the rail towards the key portion to tighten the joint.

Preferably the faces of the head of the key portion which are directed towards the remainder of the connector are arranged at an acute angle to the axis of the connector and the inner faces of the lips of the channel-shaped member have a corresponding inclination, so that, when the clamping device urges the head of the key portion into engagement with the lips of the member the correspondingly inclined faces urge the lips towards one another and so prevent the side walls of the channel-shaped member from splaying open when the joint is stressed.

The head of the key portion may be separate from the remainder of the connector and the clamping device may be arranged to pull the head towards the remainder of the connector so sandwiching the lips of the channel-shaped member between the head and the remainder of the connector. When the head of the key portion of the connector is separate the connector may include a shoulder which acts as a spacer between the channel-shaped member and the rail, the clamping device clamping the lips of the channel-shaped member between the head and the shoulder and the counter-sunk head bolt urging the rail against the other side of the shoulder. Alternatively the head may be integral with the connector and in this case the clamping device is preferably a grub screw and the means in the connector is preferably an axial threaded bore extending through a neck of the connector joining the head to the remainder of the connector so that when the grub screw is screwed into the bore and tightened, the grub screw bears against the base of the channel-shaped member and urges the head of the connector against the lips of the channel-shaped member.

The ramp surface may be flat and inclined in the same sense as the inclined surface on the head of the key portion but preferably it is a frusto-conical surface which surrounds the screw-threaded hole in the tongue of the connector like an enlarged countersink. Preferably the connector includes at least two threaded holes, each having a corresponding frusto-conical ramp surface and in this case a counter-sunk bolt is also inserted into the other threaded hole.

When the head of the key portion of the connector is separate the clamping device preferably includes a strip of metal which is placed between a pair of opposed grooves in the remainder of the connector and which includes at least one hole, a bolt passing through the, or each, hole and being screwed into a threaded bore in the separate key portion of the connector so that as the, or each, bolt is screwed into the key portion the key portion moves towards the remainder of the connector to sandwich the lips of the channel-shaped member between the key portion and the remainder of the connector.

This invention is particularly useful when the two members to be joined are extruded aluminium sections. When the rail is made from an extruded aluminium section it has the further advantage that, as the bolt is tightened in the threaded hole in the connector, the side wall of the extrusion is deformed by the counter-sunk head towards the connector, the slight resilience of the aluminium side wall serving to lock the joint together and lock the bolt in the same way as a spring washer.

The inwardly lipped channel-shaped member may form a part of an extrusion having a generally arcuate cross-section or a L-shaped cross-section. In both of these cases where the extrusion is being used as a leg of a table it preferably includes an inwardly lipped channel-shaped member along each of its edges so that one rail may be connected to each edge of the extrusion. The rail may be C-shaped or U-shaped in cross-section but it is very much stronger if it has a closed, rectangular hollow section and thus such a section is preferred.

Exampls of connectors and joints in accordance with our invention which are used to join a leg and a rail of a table having four legs will now be described with reference to the accompanying drawings, in which.

Figure 1:
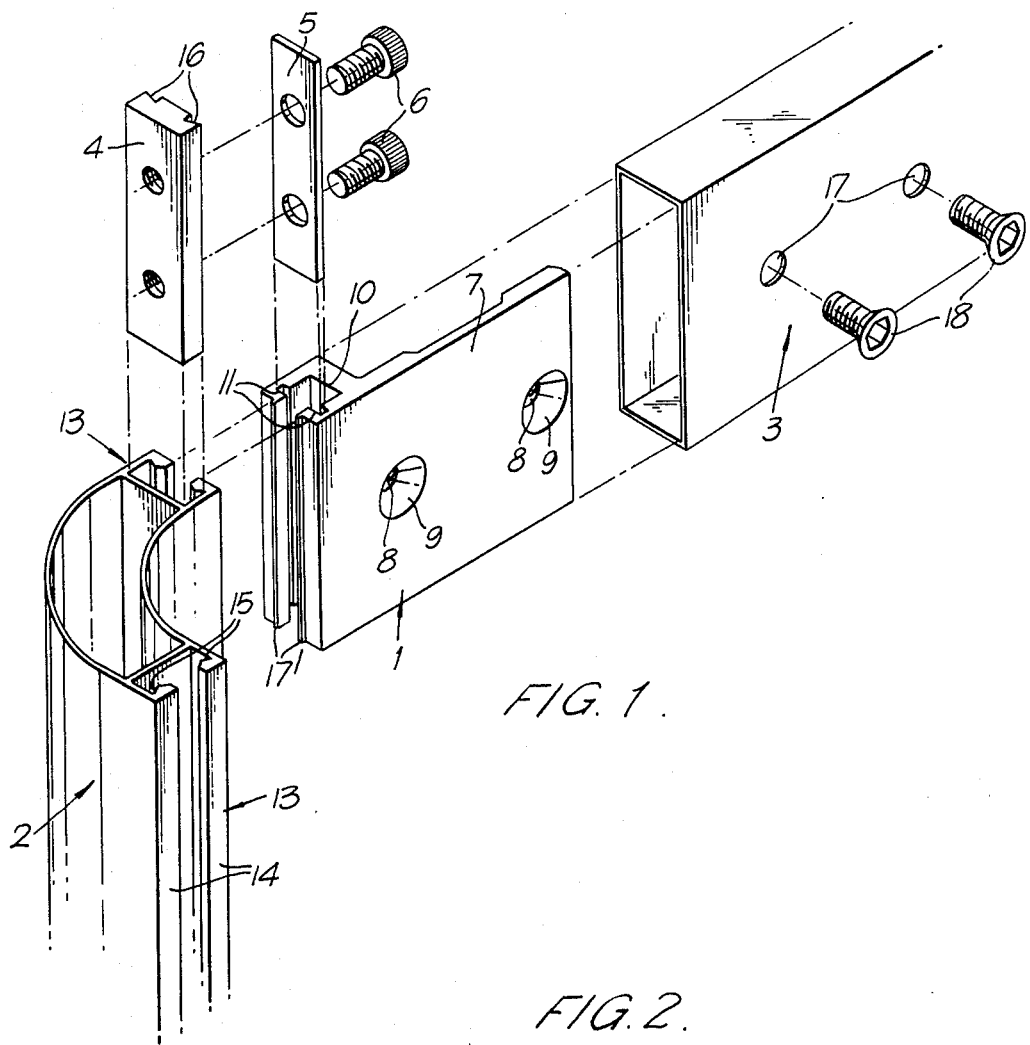
FIG. 1 is an exploded perspective view of a first example.
Figure 2:
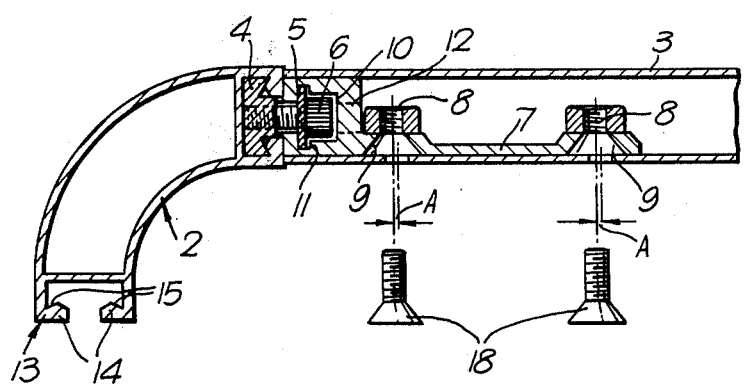
FIG. 2 is a horizontal section through the partly assembled joint.

The first example shown in FIGS. 1 and 2 comprises a connector 1, a leg 2 and a rail 3. The connector 1 includes a separate head 4 with its associated clamping device formed by a strip 5 and a pair of set screws 6, the clamping device joining the head 4 to the remainder of the connector 1. The remainder of the connector 1 includes a tongue portion 7 in which two screw-threaded holes 8 are formed, the holes having counter-sinks 9 formed in one face of the tongue portion 7.

The connector 1 also includes a groove 10 which is arranged to receive the heads of the set screws 6 and a pair of opposed grooves 11 which are arranged to receive the strip 5. A pair of drillings 12 are also provided which are in alignment with the set screws 6 to give access to the heads of the set screws 6 to enable them to be tightened.

The leg 2 includes a channel-shaped member 13 along each of its edges and each channel-shaped member 13 includes a pair of inwardly directed lips 14. Internal faces 15 on the lips 14 are inclined at an acute angle to the sides of the channel-shaped member 13. The separate head 4 also includes a pair of inclined faces 16 which are inclined at an acute angle to the axis of the connector 1 at a corresponding inclination to the inclination of the faces 15. The connector 1 also includes a pair of ribs 17' projecting towards the head 4 from each side of the groove 10.

To assembly this example of the joint the head 4 of the connector is slid between the side walls of the channel-shaped member 13 of the leg 2 until it reaches its required location. The set screws 6 are then tightened using an Allen key inserted through the drillings 12 to fix the connector 1 onto the leg 2. The ribs 17' are received in the slot between the lips 14 of the channel-shaped member 13 and this prevents the connector at the sides of the groove 10 from splaying open as the set screws 6 are tightened. The cooperating inclined faces 15 and 16 formed on the lips of the channel-shaped member and on the head 4 of the connector tend to ride over one another to draw the lips 14 of the channel-shaped member together and prevent the channel-shaped member 13 from splaying open when the joint is stressed. Thus when the set screws 6 have been fully tightened the connector 1 is locked onto the leg 2 in such a way that each of the various parts of the connector 1 cooperate and interfit so that a very secure connection is made between the leg 2 and the connector 1.

The rail 3 is of rectangular box-section and includes a pair of holes 17 which correspond to the screw-threaded holes 8. To assemble the joint the rail 3 is slid over the tongue portion 7 of the connector 1 and, when the end of the rail 3 is butted up againt the edge of the leg 2, the holes 17 are offset from the threaded holes 8 in a direction away from the leg 2 by a distance A as shown in FIG. 2. To fix the rail 3 onto the connector 1 a pair of bolts 18 having counter-sunk heads are inserted through the holes 17 and into the screw-threaded holes 8. As the bolts 15 are tightened the counter-sunk heads engage the sides of the holes 17 nearest the end of the rail 3 and as the bolts are further tightened their counter-sunk heads urge the rail 3 against the edge of the leg 2. This ensures that the rail 3 is fitted tightly against the edge of the leg 2 which gives a neat and clean appearance for the completed joint and since it puts the abutting surfaces of the leg 2 and the rail 3 under compression it increases the strength of the completed joint. As the bolts 18 are tightened, the side wall of the rail 3 is deformed into the counter-sunk portions 9 of the connector 1, so that, the heads of the bolts are accommodated.

In this example the connector 1, the leg 2 and the rail 3 are all formed by aluminium extrusions. The natural slight resilience of aluminium ensures that as the side wall of the rail 3 is deformed it acts as a compressed spring to provide a force urginhg the rail 3 towards the leg 2 and acts as a spring washer so that the bolts 18 will not work loose.

Figure 3:
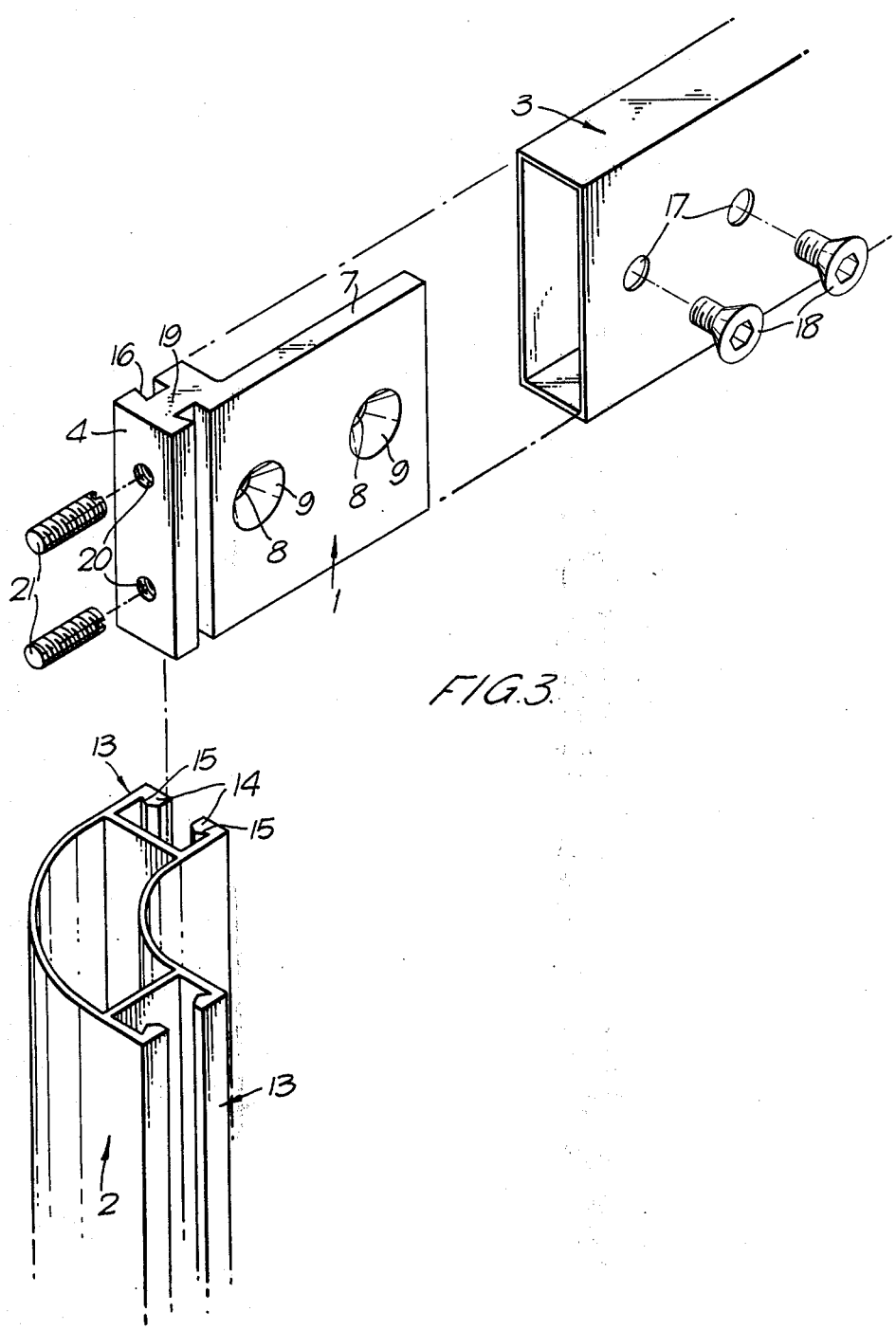
FIG. 3 is an exploded perspective view of a second example.

The second example shown in FIG. 3 operates in essentially the same way and, where appropriate, similar reference numerals have been given to corresponding parts. In this example the head 4 is rigidly fixed to the remainder of the connector by a neck 19 and the connector 1 is also provided with a pair of screw-threaded holes 20 which receive a pair of grub screws 21. To assemble this example the head 4 is slid into the channel-shaped member 13 on the leg 2 until it is in the required position and then the grub screws 21 are tightened until they engage the base of the channel-shaped member 13. Further tightening of the grub screws 21 drives the head 4 away from the base of the channel-shaped member 13 and causes the inclined faces 15 and 16 into engagement. Once again the faces 15 and 16 tend to ride over one another and in doing so draw the lips 14 of the channel-shaped members together which prevents the sides of the channel-shaped members splaying open when the completed joint is stressed. The rail 3 is then slid over the tongue portion 7 of the connector 1 and connected in an analagous fashion to the first example.

The angle subtended by the arcuate leg member 2 is preferably 91½° and in this case when the leg frame of the table is completed the outside of the joints between the legs and the rails will be urged together more firmly than the inside of the joints. This feature contributes to the formation of a close fitting joint between the leg 2 and the rail 3. The completed joint in both these examples gives a very clean and neat outside appearance and the connector is also completely obscured. When the leg is made from an aluminium extrusion the resilience of the material coupled with its arcuate section allows the leg to flex to accommodate slight distortions. This elastic flexing, means that as the table is moved in use and put under stress, slight distortions will be accommodated and the material will not be plastically deformed unless the table is subjected to very severe treatment. Thus the completed table will be more robust than a table with legs having a very rigid cross-section.

I claim:

1. A joint assembly comprising:
   i. a connector including:
      a. a head;
      b. a tongue portion extending away from said head;
      c. means defining first engagement surfaces on said head, said first engagement surfaces diverging towards and being orientated at an acute angle to said tongue portion;
      d. a ramp surface on said tongue portion;
      e. means defining a screw threaded hole at the base of said ramp surface; and,
      f. clamping means,
   ii. a clamping device operatively cooperating with said clamping means;
   iii. a channel-shaped member including:

a. a pair of lips extending along said channel-shaped member, said lips being directed towards one another to define slot means therebetween and, b. means defining second engagement surfaces on said lips, said second engagement surfaces being inclined at a corresponding inclination to said first engagement surfaces; said head of said connector being located in said channel-shaped member with the remainder of said connector issuing through said slot means and with said first and second engagement surfaces being urged into locking contact with each other by said clamping device, whereby said inclination of said first and said second engagement surfaces prevents said lips splaying apart;

iv. a hollow rail including:

a. means defining a hole in said rail; said tongue portion being received in said hollow rail and said hole in said rail being offset from said screw threaded hole in said tongue portion in a direction longitudinally of said rail and away from said head, and v. a counter-sunk headed bolt inserted through said hole in said hollow rail and into said screw threaded hole, whereby tightening of said countersunk headed bolt in combination with said offset holes and said ramp surface causes said hollow rail to move towards said channel-shaped member to tighten said joint.

2. The joint of claim 1, wherein said head of said connector is separate from said remainer of said connector and said clamping device is arranged to pull said head towards said remainer whereby said pair of said lips of said channel-shaped member are sandwiched between said head and said remainder.

3. The joint of claim 2, wherein said clamping device includes at least one screw-threaded fastener which is arranged to pull said head towards said remainer.

4. The joint of claim 1, wherein said head and said remainder of said connector are integral, said clamping device is a grub screw, and said clamping means is an axial threaded bore extending through said connector, whereby when said grub screw is inserted in said threaded bore and tightened said grub screw bears against the base of said channel-shaped member and urges said head against said lips.

5. The joint of claim 8, wherein said ramp surface is formed as a frusto conical surface, said surface surrounding said threaded hole.

6. The joint of claim 1, wherein said channel-shaped member, said connector and said rail are each extruded from aluminium.

7. The joint of claim 6, wherein said extrusion forming said member is generally arcuate in cross-section, said extrusion including one of said inwardly lipped channel-shaped members extending along each of its edges, and wherein said rail has a closed rectangular cross-section.

* * * * *